United States Patent
Wollenberg

(10) Patent No.: US 11,325,474 B2
(45) Date of Patent: May 10, 2022

(54) ELECTRICAL MACHINE FOR DRIVING PROPULSION

(71) Applicant: Rolls-Royce Deutschland Ltd & Co KG, Blankenfelde-Mahlow (DE)

(72) Inventor: Johannes Wollenberg, Gräfelfing (DE)

(73) Assignee: Rolls-Royce Deutschland Ltd & KG, Blankenfelde-Mahlow (DE)

( * ) Notice: Subject to any disclaimer, the term of this patent is extended or adjusted under 35 U.S.C. 154(b) by 304 days.

(21) Appl. No.: 16/344,407

(22) PCT Filed: Oct. 23, 2017

(86) PCT No.: PCT/EP2017/076946
§ 371 (c)(1),
(2) Date: Apr. 24, 2019

(87) PCT Pub. No.: WO2018/077773
PCT Pub. Date: May 3, 2018

(65) Prior Publication Data
US 2020/0052541 A1    Feb. 13, 2020

(30) Foreign Application Priority Data
Oct. 28, 2016   (DE) ...................... 10 2016 221 304.0

(51) Int. Cl.
*H02K 3/50*    (2006.01)
*B60L 3/00*    (2019.01)

(52) U.S. Cl.
CPC .......... *B60L 3/0061* (2013.01); *B60L 3/0069* (2013.01); *H02K 3/505* (2013.01); *B60L 2200/10* (2013.01); *B60L 2220/42* (2013.01); *B60L 2240/425* (2013.01); *H02K 2213/06* (2013.01)

(58) Field of Classification Search
CPC .............. B60L 3/0061; B60L 2200/10; B60L 2220/42; B60L 2220/50; B60L 2240/425;
(Continued)

(56) References Cited

U.S. PATENT DOCUMENTS

2008/0006739 A1    1/2008   Mochida
2011/0254493 A1   10/2011   Pasuri
(Continued)

FOREIGN PATENT DOCUMENTS

DE           3631298 A1 *  3/1988  ............. H02K 17/30
DE       102013102194 A1    9/2014
(Continued)

OTHER PUBLICATIONS

German Research Report for German Application No. 10 2016 221 304.0, dated Dec. 16, 2016.
(Continued)

*Primary Examiner* — Alex W Mok
(74) *Attorney, Agent, or Firm* — Lempia Summerfield Katz LLC

(57) ABSTRACT

The invention relates to a particularly redundant electrical machine (10) for driving a means of propulsion (1) with increased reliability. The machine (10) comprises a plurality of independent partial rotors (210, 220) which are respectively coupled to a common shaft (200) by means of freewheel devices (510, 520) in order to drive said shaft and the means of propulsion (1) therewith in a working direction of rotation. The machine (10) also comprises a plurality of independent stator winding systems (111, 121), a stator winding system (111, 121) and a partial rotor (210, 220) being respectively associated with each other and arranged in such a way that they can electromagnetically interact with each other. The stator winding systems (111, 121) are successively arranged in the axial direction. Similarly, the partial rotors (210, 220) are successively arranged in the axial direction.

9 Claims, 1 Drawing Sheet

(58) Field of Classification Search
CPC .... B60L 3/0046; B60L 3/0069; B60L 3/0092; B60L 3/04; B60L 50/51; H02K 16/00; H02K 2213/06; H02K 3/505; H02K 7/116; H02K 7/14; Y02T 10/641; Y02T 10/646; Y02T 10/7005
USPC ...................................................... 310/184
See application file for complete search history.

(56) References Cited

U.S. PATENT DOCUMENTS

| | | |
|---|---|---|
| 2014/0203739 A1 | 7/2014 | Chantriaux |
| 2016/0347180 A1 | 12/2016 | Steffani |
| 2017/0190435 A1 | 7/2017 | Kobayashi |

FOREIGN PATENT DOCUMENTS

| | | |
|---|---|---|
| DE | 202015106564 U1 | 3/2016 |
| EP | 2896532 A1 | 7/2015 |
| WO | WO2016009824 A1 | 1/2016 |

OTHER PUBLICATIONS

PCT International Search Report and Written Opinion of International Searching Authority dated Feb. 13, 2018 corresponding to PCT International Application No. PCT/EP2017/076946 filed Oct. 23, 2017.

\* cited by examiner

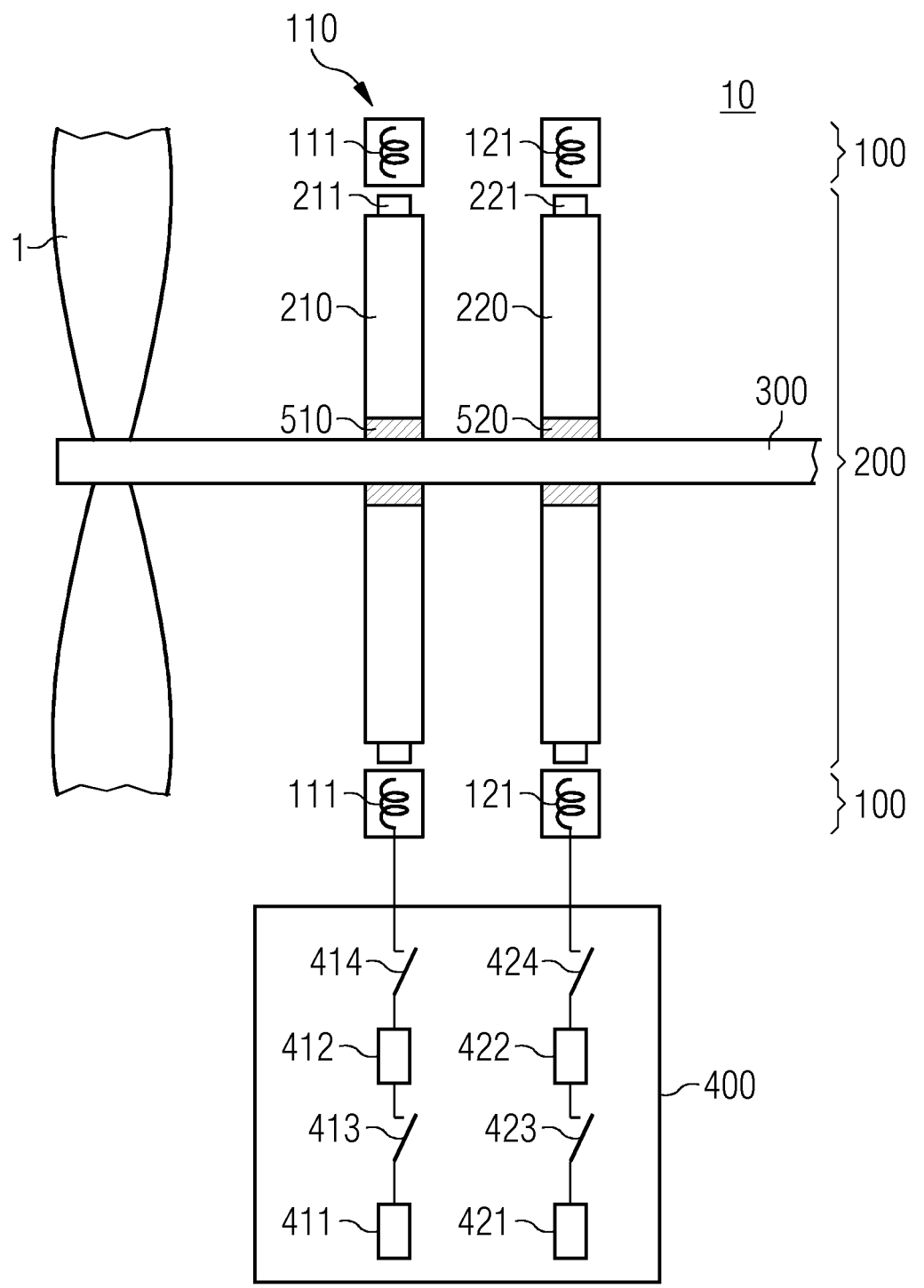

ELECTRICAL MACHINE FOR DRIVING PROPULSION

CROSS REFERENCE TO RELATED APPLICATIONS

This present patent document is a § 371 nationalization of PCT Application Serial Number PCT/EP2017/076946, filed Oct. 23, 2017, designating the United States, which is hereby incorporated in its entirety by reference. This patent document also claims the benefit of DE 102016221304.0, filed on Oct. 28, 2016, which is also hereby incorporated in its entirety by reference.

FIELD

Embodiments relate to an electrical machine for driving propulsion with increased reliability.

BACKGROUND

In electrical machines, the insulations of the stator winding system of the machine may fail on account of material or production faults that are not identified or may not be identified and also in the case of operational overloads, such as due to voltage and/or current peaks for example. Faults may occur, for example, when a turns short, a winding short or a short to ground occurs in the stator winding system. A failure causes a functional breakdown in the further course of damage and, in the worst-case scenario, a fire in the electrical machine. A development of this type constitutes, in principle, a risk situation since at least a breakdown and possibly damage to the machine occurs, and may have more or less serious consequences depending on the application of the machine. For example, in the case of application of the electrical machine as part of the drive system of an electrically or hybrid-electrically driven aircraft, the breakdown of the electrical machine may have fatal consequences. Accordingly, components that are used in the aviation sector should include a sufficient degree of reliability.

In order to reduce the probability of breakdown or to improve reliability, electrical machines for use in aircraft drives, such as in EP2896532A1 for example, may include, for safety reasons, a redundancy in the form of two DC-isolated winding systems that are distributed along the circumference of the stator, where a dedicated voltage source is provided for each of the two winding systems. The two separate winding systems interact with only one permanent-magnet rotor. If a fault, for example an excessive temperature, an excessive voltage or an excessive current, is identified in one of the two winding systems or in one of the two voltage sources, deactivation of the faulty motor winding or the faulty voltage source is triggered by switching off the associated voltage source, while the second winding system may continue to operate in a normal manner.

Although the described system allows operation to continue, the system is not configured to prevent an electric current from continuing to flow through the faulty winding system in the event of a fault, and may lead to overheating of the machine. A source of a current flow of this kind may be the actual current source that normally supplies the stator winding system. Consequently, this may and has to be immediately switched off when a fault is established. However, additionally, the currents that are induced in the winding system on account of the continued rotation of the motor rotor with respect to the faulty stator winding system, the currents occurring, for example, in the case of permanent-magnet electrical machines, also are taken into account. On account of the associated fire hazard, the dangerous overheating should be prevented immediately following detection of the fault by safe interruption of this current flow, that promotes the progress of damage, in the winding system.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide an electrical machine with improved reliability.

The electrical machine for driving a propulsion of an aircraft includes a stator system including at least one first and one second stator winding system, an energy supply device for supplying the stator winding systems with electrical energy or for supplying current to the stator winding systems, a rotor system including at least one first and one second partial rotor and also a common shaft for transmitting a drive power, the is provided by each of the partial rotors, to the propulsion. The machine also includes more than the two mentioned partial rotors or stator winding systems. The number of partial rotors corresponds to the number of stator winding systems. The first partial rotor is associated with the first stator winding system and the second partial rotor is associated with the second stator winding system. Each of the partial rotors may be rotated substantially without torque, e.g. apart from frictional losses, in relation to the stator winding system associated with it and in relation to the respectively other partial rotor. Partial rotors and stator winding systems that are associated with one another form a respective first or second partial drive system and are configured and arranged in relation to one another in such a way that the partial rotors and stator winding systems may electromagnetically interact with one another, so that the partial rotors and stator winding systems operate as electric motor units. Each of the partial rotors is connected to the shaft with the aid of a respective freewheeling device in such a way that the respective first or second partial rotor may transmit a torque to the shaft only in one working direction of rotation of the shaft.

The first partial rotor is connected to the shaft with the aid of a first freewheeling device so that the first partial rotor may transmit a torque to the shaft only in the working direction of rotation, and the second partial rotor is connected to the shaft with the aid of a second freewheeling device so that the second partial rotor may likewise transmit a torque to the shaft only in the working direction of rotation. The torques that are impressed into the partial rotors by the stator winding systems in the operating state of the electrical machine are added up on the common shaft in the working direction of rotation. None of the partial rotors may transmit a torque to the common shaft in the direction of rotation opposite to the working direction of rotation on account of the freewheeling devices. Furthermore, the use of the freewheeling devices guarantees that no torque may be transmitted to the partial rotors by the shaft that always rotates in the same working direction of rotation.

In order to realize the electromagnetic interaction of partial rotors and stator winding systems that are associated with one another, each of the partial rotors includes magnetic capabilities that are configured and arranged on the respective partial rotor in such a way that a magnetic field of the stator winding system, e.g. the magnetic field is generated by an electric current that is fed into the respective stator winding system, interacts with the magnetic the associated partial rotor or with the magnetic fields thereof in such a way that the associated partial rotor is set in rotation. Therefore, the electrical machine operates as an electric motor in this case. The rotation of the associated partial rotor is transmitted to the shaft in order to ultimately set the propulsion in rotation.

The partial rotors are arranged concentrically and one behind the other as seen in the axial direction.

Analogously, the stator winding systems are arranged one behind the other as seen in the axial direction.

On account of the partial rotors or the stator winding systems each being arranged one behind the other in the axial direction, it is possible to prevent currents being induced in the stator winding system of the faulty partial drive system by the still rotating partial rotor of the intact partial drive system in the event of a fault. This is not possible in the case of stator winding systems that are arranged one behind the other or next to one another or alternately in the circumferential direction.

In each case one of the components of a group of components including one of the stator winding systems and the partial rotor that is associated with the stator winding system is arranged radially within the other component of the group of components. In a first variant, the partial rotors are configured as internal rotors. Each of the partial rotors is arranged radially within the respectively associated stator winding system. In a second variant, the partial rotors are configured as external rotors. Each of the partial rotors is arranged radially outside the respectively associated stator winding system. The two variants provide a reduced physical size of the electrical machine as seen in the axial direction.

In an embodiment, the stator winding systems are DC-isolated from one another. As an alternative, provision may be made for the stator winding systems to be electrically connected to one another during normal operation, but for it to be possible, for example in the event of a fault, to DC-isolate the stator winding systems. The measure of permanent isolation or DC-isolation, that is to be established, of the stator winding systems also has the effect that no significant currents flow in the stator winding system of the faulty partial drive system in the event of a fault.

The machine includes a drive controller that is configured to monitor the electrical machine and the partial drive systems in respect of the presence of a fault. When a fault is detected in one of the partial drive systems, that may consequently be referred to as a "faulty partial drive system", the drive controller establishes DC-isolation of the stator winding system of the faulty partial drive system from the energy supply device. The isolation may be realized, for example, by corresponding switches in the electrical connections between the energy supply device and the respective stator winding system.

In the event of a fault, no more current is fed from the energy supply device into the stator winding system in question, so that consequently no overheating may occur there. Since only the energy supply to the faulty stator winding system in question is interrupted, the intact stator winding system may continue to operate, so that the drive system may still operate, albeit at a reduced power. A fault may involve, for example, an excessive temperature or an insulation fault established in the winding system in question or the energy supply device or one of the separate current sources breaking down.

The energy supply device includes a first current source, that is associated with the first partial drive system, for the first stator winding system and includes a second current source, that is associated with the second partial drive system, for the second stator winding system. The current sources are configured to supply the respective stator winding system with electric current.

The above-mentioned monitoring of the partial drive systems with respect to the presence of a fault includes the current sources introduced here, that are also monitored in respect of the presence of a fault. The isolation of the stator winding system of the faulty partial drive system from the energy supply device implies that the stator winding system is isolated from the associated current source. The other, non-faulty stator winding system remains connected to its current source and may continue to operate in the normal manner.

The partial drive systems each include a converter that is in each case electrically connected between the current source and the stator winding system of the respective partial drive system and that is in each case configured to convert an electrical energy that is provided by the respective current source into an electrical voltage that is suitable for operating the respective stator winding system. In each case one group of switches each including at least one switch is provided in each of the partial drive systems, where at least one switch of the respective group of switches is electrically arranged between the respective current source and the respective converter and/or at least one switch of the respective group of switches is arranged between the respective converter and the respective stator winding system. A first group of switches is provided, for example, in the first partial drive system. The first group of switches includes at least one switch. The switch may be electrically arranged between the first current source and the first converter or between the first converter and the first stator winding system. The first group of switches may also have two switches where one of the two switches is electrically arranged between the first current source and the first converter and the other switch is arranged between the first converter and the first stator winding system. A corresponding arrangement is provided in the second partial drive system. The DC-isolation of the stator winding system of the faulty partial drive system from the energy supply device is realized by opening at least one of the switches of the group of switches of the faulty partial drive system.

In this case, "opening" of a switch refers to or has the effect that the opened switch interrupts the current flow or disconnects the corresponding electrical connection.

The drive controller is configured to initiate opening of the respective switch. The drive controller is further configured in such a way that the drive controller selects which switch of the respective group of switches is opened depending on the location of the occurrence of the fault in the faulty partial drive system.

During operation of an electrical machine, the electrical machine and the partial drive systems are monitored in respect of the presence of a fault. If a fault is established in one faulty partial drive system from amongst the partial drive systems, the stator winding system of the faulty partial drive system is DC-isolated from the energy supply device, so that the isolated stator winding system no longer electromagnetically interacts with the partial rotor associated with it and the partial rotor therefore no longer exerts any torque onto the shaft either.

The partial drive systems each include a current source with which the stator winding system of the respective drive system is supplied with electric current. In the event of a fault, the stator winding system of the faulty partial drive system is electrically isolated from the current source of the faulty partial drive system, e.g. the electrical connection between the current source and the stator winding system is interrupted.

The partial drive systems each also include a converter that is in each case electrically connected between the current source and the stator winding system of the respective partial drive system and that is in each case configured to convert an electrical energy, that is provided by the respective current source, into an electrical voltage that is suitable for operating the respective stator winding system. In the event of a fault, a first electrical connection between the current source and the converter of the faulty partial drive system or a second electrical connection between the converter and the stator winding system of the faulty partial drive system is disconnected in the faulty partial drive system.

In this case, the first or else the second electrical connection in the faulty partial drive system is disconnected depending on the location of the occurrence of the fault.

An electrical connection may be disconnected, for example, by a switch that is integrated in the connection being opened.

In the event of a fault, for example in the event of an excessive temperature or an insulation fault, the movement of the partial rotor in question or involved or the movement of the magnetic capabilities that are fastened to the partial rotor in relation to the faulty stator winding system has to be prevented in order to prevent a current flow, that is induced by the rotor with, for example, permanent-magnet excitation, in the faulty winding system and the associated, possibly critical thermal introduction of energy (at points) at the site of the fault and therefore a possible fire. This is achieved by distributing the redundant and DC-isolated winding systems described in the introductory part in the axial direction instead of, as is otherwise usual, in the circumferential direction. Two or else more winding systems that are independent of one another and are isolated and arranged one behind the other in the axial direction are used.

At the same time, the rotor includes a corresponding number of partial rotors that are seated on a shaft one behind the other in the axial direction and that are installed using the freewheeling devices in such a way that partial rotors may be rotated counter to one another in a rotation direction substantially without torque or with a very small torque on account of unavoidable friction in the freewheeling device. The torques that are impressed into the partial rotors by the stator winding systems are added up on the common motor shaft in the working direction of rotation.

The use of the freewheeling devices includes the effect that each of the electric motors may be mechanically uncoupled from the common shaft, so that firstly, on account of the freewheeling devices, none of the partial rotors may transmit a working torque to the common motor shaft in the direction of rotation counter to the working direction of rotation. Secondly, the shaft, that always rotates in the same working direction of rotation, cannot apply any torque to the respectively uncoupled partial rotors on account of the freewheeling devices. Therefore, if on account of a fault and corresponding disconnection of the associated stator winding system, for example, one of the partial rotors is no longer driven by the associated stator winding system, the partial rotor will come to a standstill since the still rotating shaft cannot transmit any torque to the partial rotor owing to the use of the freewheeling devices. Consequently, when the partial rotor is at a standstill, no current may be induced in the disconnected stator winding system by the partial rotor, as a result of which the risk of overheating and fire described in the introductory part may be substantially precluded.

If a fault, for example an excessive temperature or an insulation fault, is detected in one of the stator winding systems by the drive controller or if one of the voltage sources breaks down, the respectively involved voltage source or voltage source in question is DC-isolated. The intact partial drive system including the stator winding system and the associated partial rotor may continue to operate alone, so that the electrical machine continues to remain functional with a correspondingly reduced power. By the freewheeling device of that partial rotor that interacts with the faulty winding system, the rotation of the partial rotor is prevented owing to a lack of interlocking or force-fitting connection with the motor shaft, so that induction of undesired current in the faulty winding system is also suppressed. After deactivation, including DC-isolation, of the associated current source, no more energy may be introduced into the faulty winding system as a result. No more current flows across the damaged point of the winding system that would cause a further introduction of thermal energy and therefore could constitute a fire hazard in the further course.

Accordingly, the presented solution allows for effective use of the redundancy of the electrical machine including a plurality of stator winding systems that are DC-isolated from one another by preventing the undesired introduction of energy into a damaged winding system by decoupling the associated rotor part with a freewheeling device, this leading to a reduction in the probability of occurrence of a fire in the electrical machine.

BRIEF DESCRIPTION OF THE FIGURES

FIG. 1 depicts a cross section through a redundant electrical machine that is equipped with a plurality of partial rotors and a plurality of stator winding systems according to an embodiment.

DETAILED DESCRIPTION

Terms such as "axial" and "radial" relate to the shaft or axis used in the respective FIGURE or in the respectively described example. The directions axial and radial always relate to a rotation axis of the respective rotor.

FIG. 1 depicts, by way of example and in simplified form, an electrical machine 10 that is configured as an electric motor or drive arrangement. Various components of the machine may be arranged differently depending on the configuration of the electrical machine as a generator or as an electric motor and/or as, for example, a radial or axial flux machine with a rotor that is configured as an internal or else as an external rotor, etc.

The electric motor 10 may be provided, for example, in order to drive a propulsion 1 of an aircraft (not illustrated), for example a propeller 1, in such a way that the propeller 1 rotates in a working direction of rotation in order to propel the aircraft. Other uses of the electrical machine for drive purposes or for other applications are of course conceivable. To this end, the electric motor 10 and the propeller 1 are connected by a shaft 300 of the electric motor 10. The electric motor 10 is configured as described below in order to set the shaft 300 and, with it, the propeller 1 in rotation in the working direction of rotation.

The basic manner of operation of an electric motor 10 is known. The electric motor 10 includes a stator system 100 and also a rotor arrangement 200 that is configured as an internal rotor. The rotor arrangement 200 is arranged within the stator system 100 and rotates about a rotation axis in the working direction of rotation in the operating state of the electrical machine 10. The rotor arrangement 200 is connected to the shaft 300, so that rotation of the rotor arrangement 200 in the working direction of rotation may be transmitted to the propeller 1 by the shaft 300. In this case, provision is made for the shaft 300 to always be operated in the same working direction of rotation.

The stator system 100 includes a stator winding arrangement 110 including a large number of electrical lines into which an electric current may be fed with the aid of an energy supply device 400, leading to the build-up of a magnetic field.

The rotor arrangement 200 includes magnetic capabilities 211, 221 that may be configured as permanent magnets, for example if the electric motor 10 is a permanent-magnet machine 10. As an alternative, the magnetic capabilities 211, 221 may be configured as windings that are excited or may be excited. The magnetic capabilities may be permanent magnets 211, 221.

The stator winding arrangement 110 and the magnetic capabilities 211, 221 of the rotor arrangement 200 are configured and arranged in relation to one another in such a way that the stator winding arrangement 110 and the magnetic capabilities 211, 221 electromagnetically interact with one another in the operating state of the electrical machine 10, so that the machine 10 operates as an electric motor. This concept including the general conditions for the design and arrangement of the stator winding arrangement 110 and the magnetic capabilities 211, 221 and, respectively, of the stator system 100 and the rotor arrangement 200 are known. Electric current is applied to the stator winding arrangement 110 with the aid of the energy supply device 400, having the effect that the stator winding arrangement 110 generates corresponding magnetic fields that electromagnetically interact with the magnetic fields of the permanent magnets 211, 221 of the rotor arrangement 200. This results in the rotor arrangement 200 and, with it, the shaft 300 and also the propeller 1 being set in rotation given suitable configuration and arrangement of the components in relation to one another.

The rotor arrangement 200 includes a large number of partial rotors 210, 220, where there are two partial rotors 210, 220. The partial rotors 210, 220 are arranged on the shaft 300 one behind the other in the axial direction and coaxially in relation to one another and also in relation to the shaft 300 in order to set the shaft 300 in rotation in the working direction of rotation. Permanent magnets 211 are arranged along the circumference of the first partial rotor 210. Permanent magnets 221 are likewise arranged along the circumference of the second partial rotor 220. The partial rotors 210, 220 are independent of one another, e.g. may be rotated in opposite directions to one another.

The stator winding arrangement 110 includes a number of stator winding systems 111, 121 that corresponds to the number of partial rotors 210, 220. Electric currents for generating corresponding magnetic fields may be fed into the stator winding systems by the energy supply device 400 as described above in each case. Here, the stator winding systems 111, 121 are independent of one another, for example, different electric currents may be fed into the various stator winding systems 111, 121. The energy supply device 400 includes a first and a second current source 411, 421 and also a first and a second converter 412, 422. The first current source 411 is connected to the first stator winding system 111 by the first converter 412 and the second current source 421 is connected to the second stator winding system 121 by the second converter 422. The converters 412, 422 are configured and controlled by a drive controller 600 to convert the electrical energy provided by the respective current source 411, 421 into the electrical voltage that is suitable for operating the respective stator winding system 111, 121. Like the partial rotors 210, 220, the stator winding systems 111, 121 are also arranged one behind the other in the axial direction and coaxially in relation to one another and also in relation to the shaft 300.

The first partial rotor 210 is associated with the first stator winding system 111 and the second partial rotor 220 is associated with the second stator winding system 121. Each of the partial rotors 210, 220 may be rotated in relation to the stator winding system 111, 121 that is associated with it and in relation to the respectively other partial rotor 220, 210. Furthermore, partial rotors 210, 220 and stator winding systems 111, 121 that are associated with one another are configured and arranged in relation to one another in such a way that, as described above, the partial rotors 210, 220 and stator winding systems 111, 121 may electromagnetically interact with one another in such a way that the electrical machine 10 operates as an electric motor and the shaft 300 is driven. During normal operation, as long as there is no fault, the two partial rotors 210, 220 may each exert a torque, that acts in the working direction of rotation, on the shaft 300, so that the two torques add up to form a total torque.

The first partial rotor 210 and the first stator winding system 111 form a first partial drive system T1. the first current source 411 and the first converter 412 may be associated with the first partial drive system. Analogously, the second partial rotor 220 and the second stator winding system 121 form a second partial drive system T2. The second current source 421 and the second converter 422 may be associated with the second partial drive system.

The first and the second partial rotor 210, 220 are each connected to the shaft 300 by a first and, respectively, a second freewheeling device 510, 520 in such a way that the partial rotors 210, 220 may transmit a torque to the shaft 300 only in the working direction of rotation. The torques that are impressed into the partial rotors 210, 220 by the stator winding systems 111, 121 in the operating state of the electric motor 10 are added up on the common shaft 300 in the working direction of rotation. In the direction of rotation opposite to the working direction of rotation, none of the partial rotors 210, 220 may transmit a torque to the common shaft 300 on account of the freewheeling devices 510, 520. The use of the freewheeling devices 510, 520 guarantees that no torque may be transmitted to the partial rotors 210, 220 by the shaft 300 that always rotates in the same working direction of rotation.

Therefore if, for example, the first partial rotor 210 may no longer be actively set in rotation by the first stator winding system 111 associated with it on account of a fault in the first partial drive system T1 but the second partial rotor 220 is still in the normal operating state and accordingly generates a torque on the shaft 300, this rotation of the shaft 300 in the working direction of rotation is not transmitted to the first partial rotor 210 on account of the first freewheeling device 510, so that the first partial rotor does not rotate and does not induce any currents in the first stator winding system 111. The occurrence of a fault is established with the aid of the drive controller 600 that monitors the electrical machine 100 and, for example, the partial drive systems T1, T2 and, respectively, the various components thereof in respect of the occurrence of a fault.

When a fault of this kind is detected, the current source 411, 421 of that partial drive system T1, T2 in which or for which the fault was detected is moreover DC-isolated from the faulty partial drive system T1, T2, likewise in a manner triggered by the drive controller 600. Switches 413, 414, 423, 424 are available for this purpose. In each case one switch 413, 423 is connected between the current source 411, 421 and the converter 412, 422 of the respective partial drive system T1, T2 in the two partial drive systems T1, T2 to be able to disconnect the electrical connection between the current source 411, 421 and the converter 412, 422 by opening the respective switch 413, 423. Furthermore, in each case one further switch 414, 424 is connected between the converter 412, 422 and the stator winding system 111, 121 of the respective partial drive system T1, T2 in the two partial drive systems T1, T2 to be able to disconnect the electrical connection between the converter 412, 422 and the stator winding system 111, 121 by opening the respective further switch 414, 424. Opening of the further switches 414, 424 also causes isolation of the respective stator winding system 111, 121 from the current source 411, 421 associated with it.

For example, if the fault has occurred and has been detected in the first partial drive system T1, the first current source 411 is DC-isolated from the first stator winding system 111. As described, the isolation may take place with the aid of the switches 413, 414 of the first partial drive system T1 upstream and/or downstream of the converter 412 in the direction of current flow by way of one of the switches 413, 414 or possibly both switches 413, 414 being opened. Analogously, if the fault has occurred in the second partial drive system T2, the second current source 421 is DC-isolated from the second stator winding system 121. The isolation may take place with the aid of the switches 423, 424 upstream and/or downstream of the converter 422 in the direction of current flow.

The respective switch 413, 414, 423, 424 is opened with the aid of the drive controller 600. The drive controller 600 monitors the electrical machine 10 and, respectively, the drive arrangement according to FIG. 1 in respect of the presence of a fault. The drive controller 600 establishes which of the switches 413, 414, 423, 424 is opened depending on the location at which or the component of the partial drive systems T1, T2 at which the fault occurs. For example, if the fault is in the first stator winding system 111, the switch 414 that is arranged between the stator winding system 111 and the converter 412 may be opened. The converter 412 remains connected to the current source 411 and is therefore possibly available for further applications. If the fault is detected in the current source 411 or in the converter 412, the switch 413 that is arranged between the current source 411 and the converter 412 may be opened.

The individual partial drive systems T1, T2 and, respectively, the partial rotors 210, 220 and also stators and stator winding systems 111, 121 may have the same or else different diameters and also the same or different axial lengths. The partial drive systems T1, T2 may also be electrical machines that are concentrically interleaved one in the other and that are connected to the drive shaft 300 by freewheeling devices 510, 520 that are situated axially one behind the other.

The partial rotors 210, 220 are depicted and explained in connection with FIG. 1 as internal rotors. Each of the partial rotors 210, 220 is arranged radially within the respectively associated stator winding system 111, 121. As an alternative, the partial rotors 210, 220 may also be configured, for example, as external rotors, so that the associated stator winding systems 111, 121 are arranged radially within the respectively associated partial rotor 210, 220. The concept may also be used in electrical machines with other topologies, for example in transversal flux machines, in machines with disk rotors etc.

The described electrical machine 10 may be used in an aircraft on account of the redundancy and the substantially improved reliability. However, other applications of the machine 10 are likewise conceivable, for example in electrically driven rail vehicles or watercraft.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An electrical machine for driving a propulsion device, the electrical machine comprising:
   a stator system comprising at least one first stator winding system and one second stator winding system;
   an energy supply device configured to supply the one first stator winding system and the one second stator winding system with electrical energy;
   a rotor arrangement comprising at least one first partial rotor and one second partial rotor; and
   a common shaft configured to transmit a drive power, which is provided by each of the one first partial rotor and the one second partial rotor, to the propulsion device,
   wherein the one first partial rotor is associated with the one first stator winding system, and the one second partial rotor is associated with the one second stator winding system,
   wherein each of the one first partial rotor and the one second partial rotor is rotatable substantially without torque in relation to the associated stator winding system and in relation to the respectively other partial rotor,
   wherein partial rotors and stator winding systems that are associated with one another form partial drive systems, respectively, and are configured and arranged in relation to one another such that the partial rotors and stator winding systems are configured to electromagnetically interact with one another,
   wherein each of the one first partial rotor and the one second partial rotor is connected to the common shaft with the aid of a respective freewheeling device so that the respective partial rotor is configured to transmit a torque to the common shaft only in one working direction of rotation of the common shaft, wherein the energy supply device comprises:
  a first current source that is associated with a first of the partial drive systems for the one first stator winding system; and
  a second current source that is associated with a second of the partial drive systems for the one second stator winding system,
wherein each partial drive system of the first partial drive system and the second partial drive system comprises:
  a converter that is electrically connected between a respective current source of the first current source and the second current source, and a respective stator winding system of the respective partial drive system; and
  a group of switches, and
wherein a switch of the respective group of switches is electrically arranged between the respective current source and the respective converter.

2. The electrical machine of claim 1, wherein the one first partial rotor and the one second partial rotor are arranged concentrically and one behind the other in an axial direction.

3. The electrical machine of claim 2, wherein the one first stator winding system and the one second stator winding system are arranged one behind the other in an axial direction.

4. The electrical machine of claim 3, wherein in each case, one component of a group of components comprising a stator winding system of the one first stator winding system and the one second stator winding system and the partial rotor that is associated with the stator winding system is arranged radially within another component of the group of components.

5. The electrical machine of claim 1, wherein the one first stator winding system and the one second stator winding system are DC-isolated from one another.

6. The electrical machine of claim 1, further comprising:
a drive controller configured to:
  monitor the electrical machine for presence of a fault; and
  when a fault is detected in a faulty partial drive system from amongst the partial drive systems, establish DC-isolation of the stator winding system of the faulty partial drive system from the energy supply device.

7. The electrical machine of claim 1,
wherein the first current source and the second current source are configured to supply the respective stator winding system with electric current.

8. The electrical machine of claim 7,
wherein at least one switch of the respective group of switches is arranged between the respective converter and the respective stator winding system, and
wherein the DC-isolation of the stator winding system of the faulty partial drive system from the energy supply device is realized by opening at least one of the switches of the group of switches of the faulty partial drive system.

9. The electrical machine of claim 8, wherein the drive controller is further configured to initiate opening of the respective switch, and
wherein the drive controller is further configured to select which switch of the respective group of switches is opened depending on the location of the occurrence of the fault in the faulty partial drive system.

* * * * *